United States Patent [19]

Hamada

[11] Patent Number: 4,786,151

[45] Date of Patent: Nov. 22, 1988

[54] SCANNING LENS SYSTEM FOR A LIGHT BEAM SCANNING DEVICE

[75] Inventor: Akiyoshi Hamada, Osaka, Japan

[73] Assignee: Minolta Camera Kabushiki Kaisha, Osaka, Japan

[21] Appl. No.: 142,797

[22] Filed: Jan. 11, 1988

[30] Foreign Application Priority Data

Jan. 12, 1987 [JP] Japan .................................. 62-4270

[51] Int. Cl.⁴ .......................... G02B 27/10; G02B 3/06
[52] U.S. Cl. ..................................................... 350/434
[58] Field of Search ................................. 350/434, 433

[56] References Cited

U.S. PATENT DOCUMENTS 3,750,189  7/1973  Fleischer .
3,946,150  3/1976  Grafton .
4,123,135  10/1978  Rabedeau .
4,447,112  5/1984  Matsuoka et al. .................. 350/434

FOREIGN PATENT DOCUMENTS 61-100118  6/1985  Japan .
61-128218  6/1986  Japan .

Primary Examiner—John K. Corbin
Assistant Examiner—Rebecca D. Gass
Attorney, Agent, or Firm—Price, Gess & Ubell

[57] ABSTRACT

A scanning lens system for a light beam scanning device in which a light beam emitted from a light source is shaped by a beam shaping optical element into a linear image to enter a surface of a deflection member and the beam deflected by the deflection member is restored to a circular-like image and projected onto an objective surface by the scanning lens system. The scanning lens system consisting of from the deflection member side a first, second and third single lens, the first single lens being a spherical lens with a positive refractive power, the second single lens being a toric lens with a negative refractive power in a scanning plane and with a positive refractive power in a plane perpendicular to the scanning plane, and the third single lens being a spherical lens with a positive refractive power.

5 Claims, 6 Drawing Sheets spherical aberration astigmatism f·θ characteristic spherical aberration astigmatism f·θ characteristic

FIG.5A  FIG.5B  FIG.5C
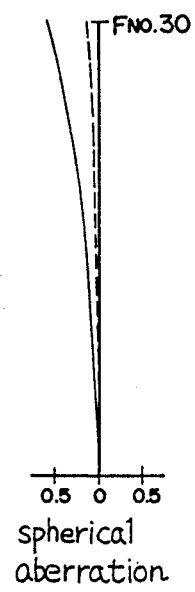
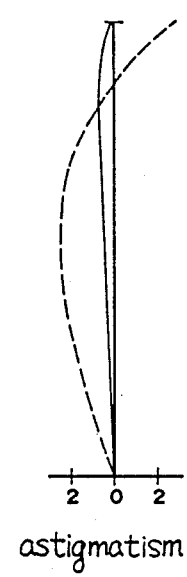
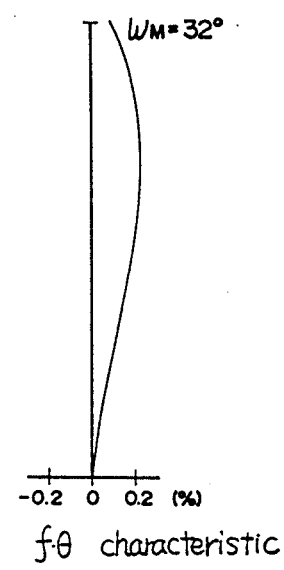
spherical aberration    astigmatism    f·θ characteristic
FIG.6A  FIG.6B  FIG.6C
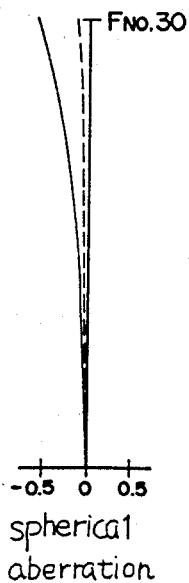
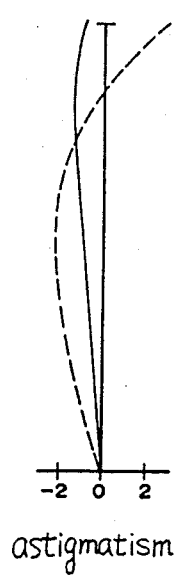
spherical aberration    astigmatism    f·θ characteristic

FIG.7A
spherical aberration
FIG.7B
astigmatism
FIG.7C
f·θ characteristic
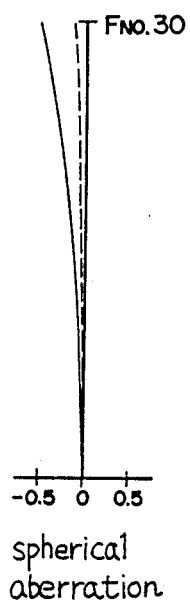
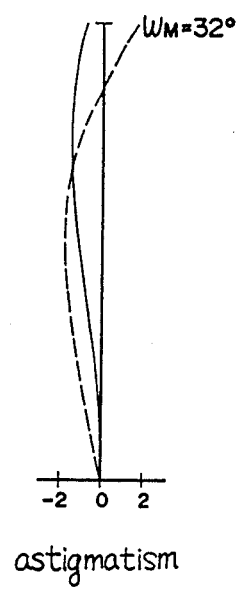
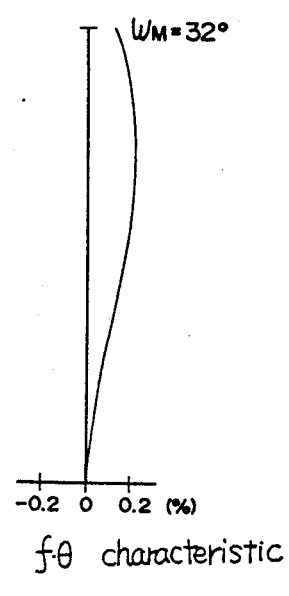
FIG.8A
spherical aberration
FIG.8B
astigmatism
FIG.8C
f·θ characteristic
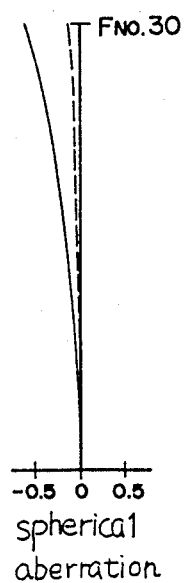
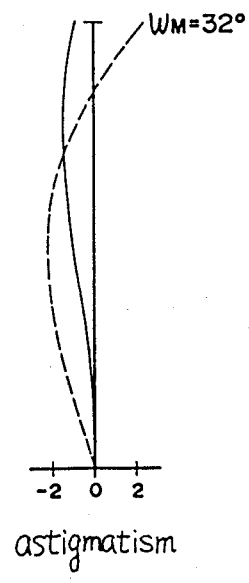
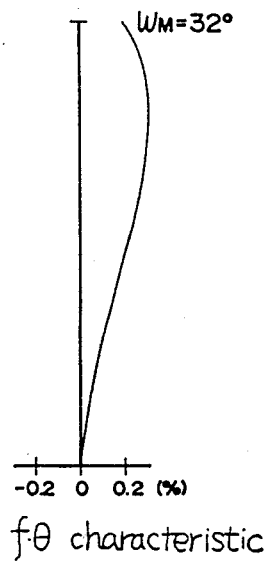

FIG.9A   FIG.9B   FIG.9C
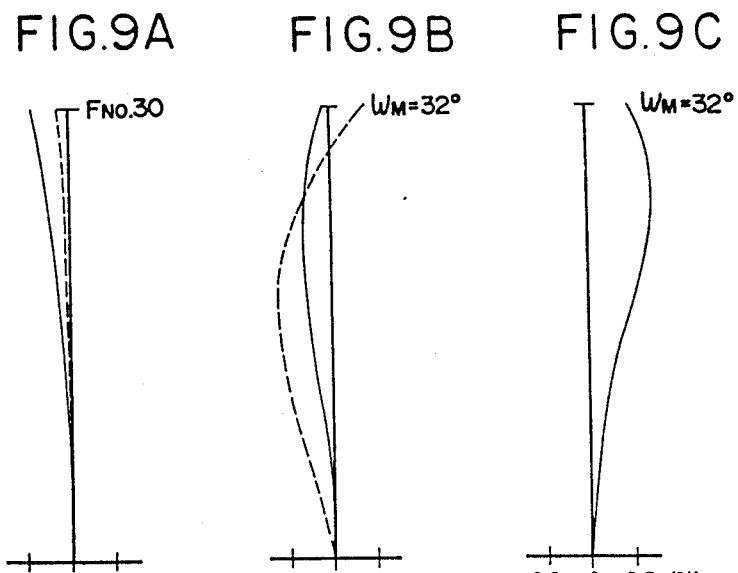
spherical aberration   astigmatism   f·θ characteristic
FIG.10A   FIG.10B   FIG.10C
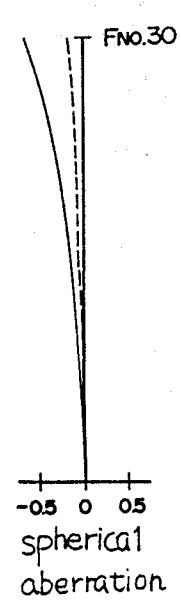 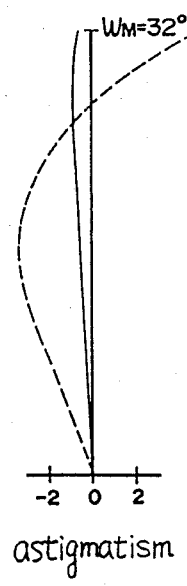 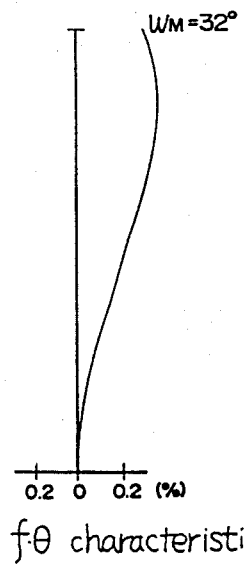
spherical aberration   astigmatism   f·θ characteristic spherical aberration astigmatism f·θ characteristic

SCANNING LENS SYSTEM FOR A LIGHT BEAM SCANNING DEVICE

FIELD OF THE INVENTION

The present invention relates to a scanning lens system for a light beam scanning device used in laser printers and the like.

BACKGROUND OF THE INVENTION

In the light beam scanning device, a light beam emitted from a light source is deflected by a deflection member such as a rotational polygon mirror and is scanned or swept on an objective surface. The scanning lens system is disposed between the deflection device and the objective surface to focus the beam on the objective plane and to maintain uniform motion of the beam on the objective surface. This uniform beam motion maintaining characteristics is called as fθ characteristics and hence the scanning lens system may be called as a fθ lens system.

If the rotational axis of the polygon mirror or the deflection surface thereof tilts from the ordinary position, there occurs an irregularity in the scanning line pitch.

For eliminating the irregularity mentioned above, U.S. Pat. No. 3,750,189 proposes an optical system for laser printers and the like which includes a beam shaping optical element such as a cylindrical lens for causing a light beam emitted from a light source to form a linear image on a surface of a deflection device, a beam confiring optical element such as a cylindrical lens for restoring the deflected beam into a circular form and a beam converging optical element having fθ characteristics for converging the restored beam to form an image on an objective surface at a constant scanning speed.

U.S. Pat. No. 3,946,150 discloses another proposal for improving the foregoing conventional construction. In this construction, a beam configuring optical element such as a cylindrical lens is interposed between the converging optical element and the objective surface to be scanned.

According to a recent advance of printers in the dot density, for example over 400 DPI, and in the print speed, it becomes demanded for the scanning lens system to have increased performance with respect to compactness, brightness (small F number), correcting degree of aberrations and correcting degree of the above mentioned irregularity.

In view of the above mentioned demands, the lens system disclosed in U.S. Pat. No. 3,759,189 has drawbacks of the limited field angle 2w, which may be expanded to 50° or 55° at most, and the large lens diameter, which is needed at least 150 mm, if an amount of astigmatism is corrected with a range of 3 or 4 mm.

In the optical system of U.S. Pat. No. 3,946,150, the beam configuring optical element must be located close to the objective surface in order to produce high quality images. It is therefore necessary for the beam configuring optical element to be long in the beam scanning direction against the demand of compactness in size.

SUMMARY OF THE INVENTION

Accordingly, the primary object of the present invention is to provide an improved scanning lens system for a light beam scanning device used in laser printers and the like.

Another object of the present invention is to provide the scanning lens system being compact in size and having a wide field angle and a small F number together with well corrected aberration characteristics and a sufficient tilt correcting function.

These and other objects are achieved by a scanning lens system for a light beam scanning device in which a light beam emitted from a light source is shaped by a beam shaping optical element into a linear image to enter a surface of a deflection member and the beam deflected by the deflection member is restored to a circular-like image and projected onto an objective surface by the scanning lens system, the scanning lens system consisting of from the deflection member side a first, second and third single lens, the first single lens being a spherical lens with a positive refractive power, the second single lens being a toric lens with a negative refractive power in a scanning plane and with a positive refractive power in a plane perpendicular to the scanning plane, and the third single lens being a spherical lens with a positive refractive power.

BRIEF DESCRIPTION OF THE DRAWINGS

These and other objects or features of the present invention will become apparent from the following description of a preferred embodiment(s) thereof taken in conjunction with the accompanying drawings, in which:

FIGS. 3A, 3B and 3C through FIGS. 11A, 11B and 11C are aberration diagrams of respective embodiments 1 to 9 according the present invention.

In the following description, like parts are designated by like reference numbers throughout the several drawings.

DETAILED DESCRIPTION OF THE PREFERRED EMBODIMENTS

First of all, it should be noted that the scanning lens system of the present invention is used in a light beam scanning device including a light source, a deflection member such as a polygon mirror and a beam shaping optical element which is disposed between the light source and the deflection member to shape a light beam into a linear image on the surface of the deflection member and may be a cylindrical lens. The scanning lens system is disposed between the deflection member and an objective surface. However, such a light beam scanning device is well known in this art field, so that the detailed description and a figure for the light beam scanning device itself are omitted in he specification. If needed, the construction disclosed in U.S. Patent No. 3,750,189 may be available for the light beam scanning device.

Figure 1:
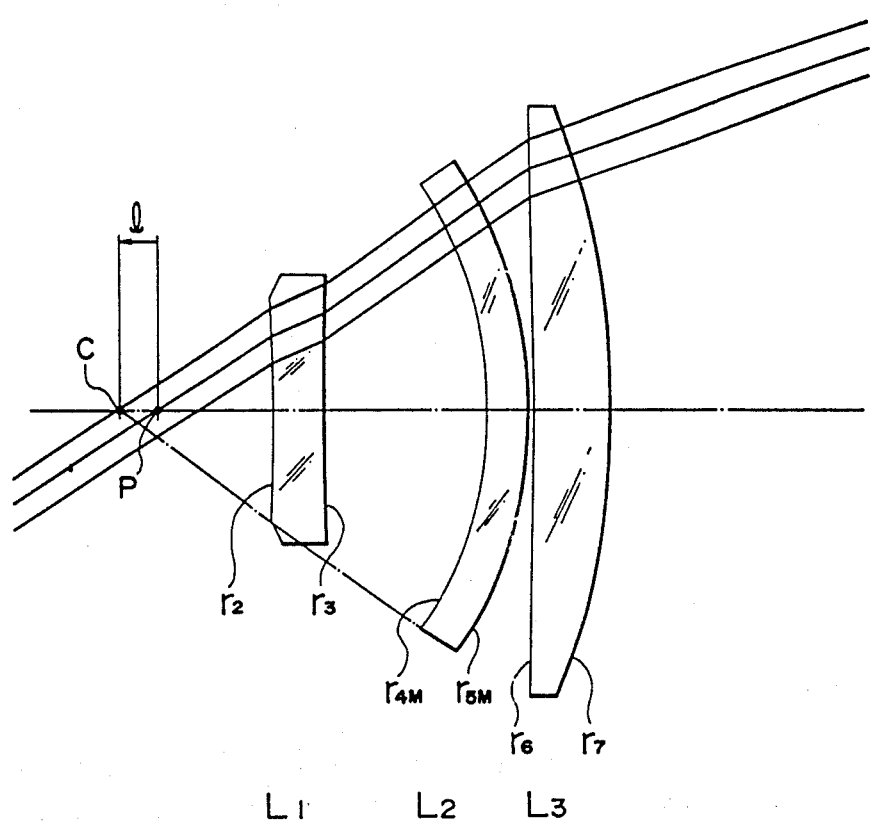
FIG. 1 is a diagram in section at a meridional plane showing the scanning lens system according to the present invention.
Figure 2:
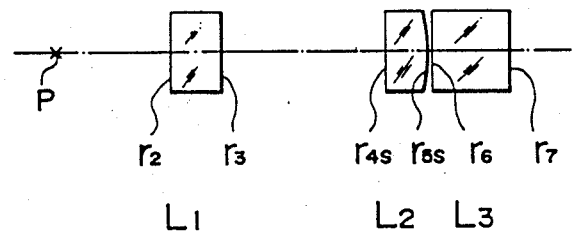
FIG. 2 is a diagram in section at a sagittal plane showing the scanning lens system according to the present invention.

Referring to FIGS. 1 and 2, the scanning lens system of the present invention has three single lenses L1, L2 and L3 arranged in order from the deflection member side (the left side in the figures). The first lens L1 is a spherical lens with a positive refractive power, the second lens L2 is a toric lens described hereafter in detail, and the third lens L3 is a spherical lens with a positive refractive power.

The second lens L2 is a toroidal lens having the center point C of the curvature near the deflection point P on the deflection member (not shown) and has a negative refractive power in the meridional plane and a positive refractive power in the sagittal plane. In detail, the surfaces $r_{4M}$ and $r_{5M}$ of the second lens L2 are coaxial circular surfaces in the meridional plane. The meridional plane coincides with the scanning plane on which the light beam is swept.

The second lens L2, in the meridional direction, effects ot maintain a curvature of image surface into substantially flat, namely to minimize Petzval's sum and the astigmatism on the sagittal side. In the sagittal direction, the second lens L2 effects to maintain a sufficient conjugate relation between the reflectum point and the image plane irrespective of the rotation of the polygon mirror. The second lens L2 independently corrects the curvature of image surface among the f·θ characteristics, and the first and third lens L1 and L3 are used in the corrections of other aberrations. This relationship enables the design to achieve the desired lens performance even if only the kind of glass materials to be used for the second lens L2 is changed such as, for example, a relation of the embodiments 1 and 7. By providing a sharing manner for the correction of aberrations as described above the burdens imposed on each lens is lesser, to thereby results in easier and wider correction of aberrations.

The scanning lens system according to the present invention fulfills the following conditions:

$$0.01 < -\frac{l}{f_M} < 0.05 \quad (1)$$

$$1 < -\frac{f_1}{f_M} < 3 \quad (2)$$

wherein l is a length between the deflection point P and the center C of curvature of the second lens surfaces, $f_M$ is a focal length of the scanning lens system in the meridional direction, and $f_1$ is a focal length of the first lens L1.

Figure 3A:
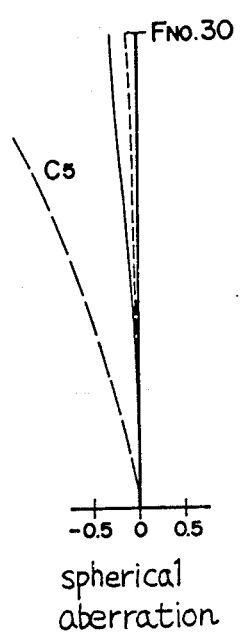
Figure 3B:
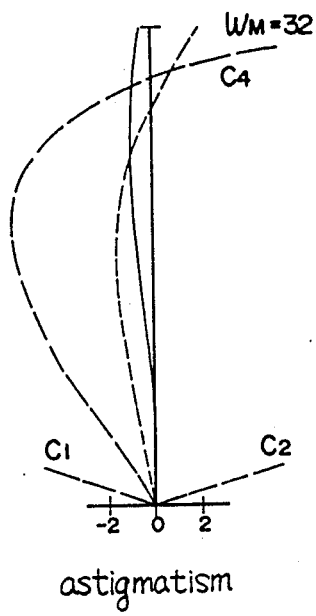

The condition (1) is provided for balancing the curvature of image surface in the meridional direction with that in the sagittal direction while maintaining the lens performance in a sufficient degree. If the condition (1) is not fulfilled, the image surface in the sagittal plane is distorted against the image surface in the meridional plane, which requires another correction manner such as additional cylindrical or toroidal surfaces. Otherwise, the astigmatism of the sagittal side becomes large extraordinarily as shown in FIG. 3B by a line $C_1$ when over the upper limit and by a line $C_2$ when below the lower limit.

Figure 3C:
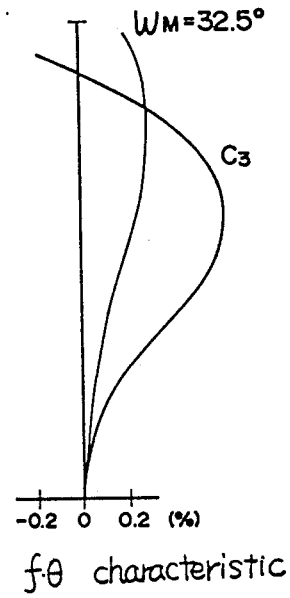
Figure 4A:
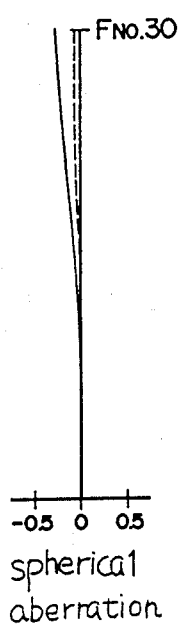
Figure 4B:
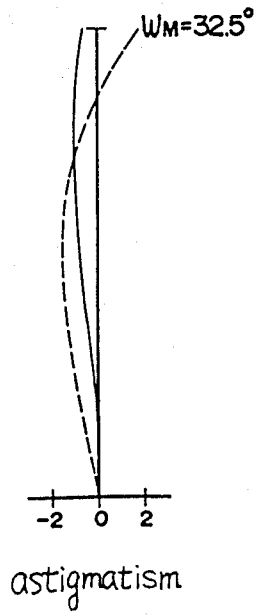
Figure 4C:
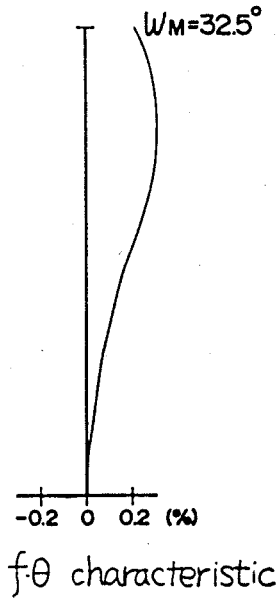
Figure 11A:
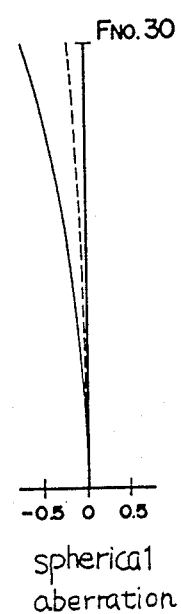
Figure 11B:
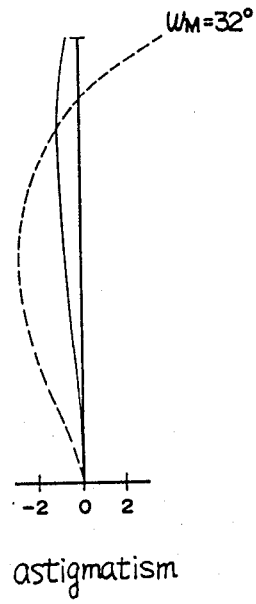
Figure 11C:
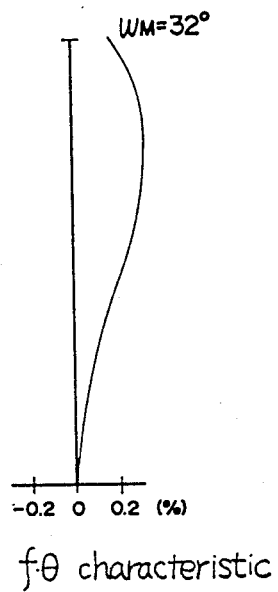

The condition (2) is provided for balancing the aberrations of the lenses with each other. If the lower limit the condition (2) is violated, the astigmatism of the sagittal side becomes large as shown by a line $C_4$ in FIG. 3B and the spherical aberration becomes large as shown by a line $C_5$ in FIG. 3A, to thereby increase violent fluctuations of the beam diameter on the objective surface. On the contrary, when the upper limit is violated, the f·θ characteristics become large as shown by a line $C_3$ in FIG. 3C, so that the uniform motion of the beam is spoiled.

There are nine embodiments of the present invention of which lens arrangements are illustrated in FIGS. 1 and 2 and aberration diagrams are shown in FIGS. 3 to 11. In these figures, a solid line represents an aberration of the meridional side and a dotted line represents an aberration of the sagittal side. The f·θ characteristics of the figures represent the distortions of the image heights (y'=fθ), respectively.

Summarizing the feature of the embodiments, a glass material with a high refractive index (n≃1.8) is used for the third lens L3 in the embodiments 1, 2, 7 and 8, a glass material BK7 (n≃1.5), that is a most commonly used material for making a lens, is used for all the lenses in the embodiment 6, a transparent plastic material is used for the second lens L2 in the embodiment 7 for facilitating the manufacture of the lens L2 of toroidal shape, the lens system has a flat surface, i.e. the surface $r_3$ in the embodiment 4 and the surface $r_6$ in the embodiment 5, for making the manufacture the spherical lens be easy. Further, the embodiment 2 is designed for a scanning width of an A4 size of papers (210 mm) and the other embodiments are designed for a scanning width of A3 size (297 mm).

Lens data of respective embodiments are shown in the following tables. In the tables, the subscript M annexed to a focal length f, a mangification β and a F number FNO. represents that these parameters are measured in the meridional plane, and in the same way the subscript S represents that these parameters are measured in the sagittal plane. In these embodiments shown in the tables, there is used a polygon mirror which has a diameter 53 mm of an inscribed circle which touches internally to respective deflection surfaces thereof.

EMBODIMENT 1

$f_M$ = 280 mm, $\beta_M$ = 0,2$\omega_M$ = 64°, FNo.$_M$ = 30
$f_S$ = 56.9 mm, $\beta_S$ = −4.63, eff.FNo.$_S$ = 30
λ = 780 nm

| | radius of curvature | axial distance | refractive index |
|---|---|---|---|
| $r_1$ | (stop) | | |
| | | $d_1$  22.000 | |
| $r_2$ | −371.369 | | |
| | | $d_2$  9.500 | $n_1$  1.51117 |
| $r_3$ | 1755.802 | | |
| | | $d_3$  31.200 | |
| $r_{4M}$ | −69.900 | | |
| $r_{4S}$ | ∞ | | |
| | | $d_4$  8.000 | $n_2$  1.51117 |
| $r_{5M}$ | −77.900 | | |
| $r_{5S}$ | −37.760 | | |
| | | $d_5$  0.800 | |
| $r_6$ | −1909.800 | | |
| | | $d_6$  15.000 | $n_3$  1.78571 |
| $r_7$ | −144.467 | | |
| | Σd | 86.500 | (s' = 317.559) |

−L/$f_M$ = 0.026
−$f_1$/$f_M$ = 2.01

EMBODIMENT 2

$f_M$ = 188 mm, $\beta_M$ = 0,2$\omega_M$ = 65°, FNo.$_M$ = 30
$f_S$ = 41.4 mm, $\beta_S$ = −4.12, eff.FNo.$_S$ = 30
λ = 780 nm

| | radius of curvature | axial distance | refractive index |
|---|---|---|---|
| $r_1$ | (stop) | | |
| | | $d_1$  20.000 | |
| $r_2$ | −382.560 | | |
| | | $d_2$  5.000 | $n_1$  1.51117 |
| $r_3$ | 643.575 | | |
| | | $d_3$  21.000 | |
| $r_{4M}$ | −54.200 | | |
| $r_{4S}$ | ∞ | | |
| | | $d_4$  5.000 | $n_2$  1.51117 |

-continued

EMBODIMENT 2

| | | | | | |
|---|---|---|---|---|---|
| $r_{5M}$ | −59.200 | | | | |
| $r_{5S}$ | −27.371 | $d_5$ | 0.200 | | |
| $r_6$ | −2257.387 | | | | |
| | | $d_6$ | 13.000 | $n_3$ | 1.78571 |
| $r_7$ | −104.904 | | | | |
| | | $\Sigma d$ | 64.200 | ($s' = 209.951$) | |

$-L/f_M = 0.044$
$-f_1/f_M = 2.49$

EMBODIMENT 3

$f_M = 280$ mm, $\beta_M = 0$, $2\omega_M = 64°$, $FNo._M = 30$
$f_S = 52.9$ mm, $\beta_S = -5.14$, eff.$FNo._S = 30$
$\lambda = 780$ nm

| | radius of curvature | axial distance | | refractive index | |
|---|---|---|---|---|---|
| $r_1$ | (stop) | | | | |
| | | $d_1$ | 22.000 | | |
| $r_2$ | −575.818 | | | | |
| | | $d_2$ | 6.000 | $n_1$ | 1.51117 |
| $r_3$ | 408.834 | | | | |
| | | $d_3$ | 27.100 | | |
| $r_{4M}$ | −62.500 | | | | |
| $r_{4S}$ | ∞ | | | | |
| | | $d_4$ | 8.000 | $n_2$ | 1.51117 |
| $r_{5M}$ | −70.500 | | | | |
| $r_{5S}$ | −34.411 | | | | |
| | | $d_5$ | 1.500 | | |
| $r_6$ | 4096.010 | | | | |
| | | $d_6$ | 14.400 | $n_3$ | 1.62803 |
| $r_7$ | −117.708 | | | | |
| | | $\Sigma d$ | 79.000 | ($s' = 320.719$) | |

$-L/f_M = 0.026$
$-f_1/f_M = 1.67$

EMBODIMENT 4

$f_M = 280$ mm, $\beta_M = 0$, $2\omega_M = 64°$, $FNo._M = 30$
$f_S = 54.4$ mm, $\beta_S = -4.96$, eff.$FNo._S = 30$
$\lambda = 780$ nm

| | radius of curvature | axial distance | | refractive index | |
|---|---|---|---|---|---|
| $r_1$ | (stop) | | | | |
| | | $d_1$ | 22.000 | | |
| $r_2$ | 294.489 | | | | |
| | | $d_2$ | 5.000 | $n_1$ | 1.51117 |
| $r_3$ | ∞ | | | | |
| | | $d_3$ | 28.743 | | |
| $r_{4M}$ | −62.400 | | | | |
| $r_{4S}$ | ∞ | | | | |
| | | $d_4$ | 10.000 | $n_2$ | 1.51117 |
| $r_{5M}$ | −72.400 | | | | |
| $r_{5S}$ | −37.760 | | | | |
| | | $d_5$ | 1.032 | | |
| $r_6$ | 3766.620 | | | | |
| | | $d_6$ | 15.000 | $n_3$ | 1.58571 |
| $r_7$ | −114.599 | | | | |
| | | $\Sigma d$ | 81.775 | ($s' = 319.830$) | |

$-L/f_M = 0.024$
$-f_1/f_M = 2.06$

EMBODIMENT 5

$f_M = 280$ mm, $\beta_M = 0$, $2\omega_M = 64°$, $FNo._M = 30$
$f_S = 60.5$ mm, $\beta_S = -4.29$, eff.$FNo._S = 30$
$\lambda = 780$ nm

| | radius of curvature | axial distance | | refractive index | |
|---|---|---|---|---|---|

EMBODIMENT 5

| | | | | | |
|---|---|---|---|---|---|
| $r_1$ | (stop) | | | | |
| | | $d_1$ | 22.000 | | |
| $r_2$ | 774.096 | | | | |
| | | $d_2$ | 5.000 | $n_1$ | 1.51117 |
| $r_3$ | 252.655 | | | | |
| | | $d_3$ | 38.001 | | |
| $r_{4M}$ | −69.000 | | | | |
| $r_{4S}$ | ∞ | | | | |
| | | $d_4$ | 10.000 | $n_2$ | 1.51117 |
| $r_{5M}$ | −79.000 | | | | |
| $r_{5S}$ | −40.626 | | | | |
| | | $d_5$ | 0.871 | | |
| $r_6$ | ∞ | | | | |
| | | $d_6$ | 15.000 | $n_3$ | 1.58571 |
| $r_7$ | −120.493 | | | | |
| | | $\Sigma d$ | 90.871 | ($s' = 316.326$) | |

$-L/f_M = 0.014$
$-f_1/f_M = 2.63$

EMBODIMENT 6

$f_M = 280$ mm, $\beta_M = 0$, $2\omega_M = 64°$, $FNo._M = 30$
$f_S = 55.8$ mm, $\beta_S = -4.84$, eff.$FNo._S = 30$
$\lambda = 780$ nm

| | radius of curvature | axial distance | | refractive index | |
|---|---|---|---|---|---|
| $r_1$ | (stop) | | | | |
| | | $d_1$ | 20.000 | | |
| $r_2$ | 511.127 | | | | |
| | | $d_2$ | 6.800 | $n_1$ | 1.51117 |
| $r_3$ | 192.611 | | | | |
| | | $d_3$ | 31.000 | | |
| $r_{4M}$ | −62.900 | | | | |
| $r_{4S}$ | ∞ | | | | |
| | | $d_4$ | 9.500 | $n_2$ | 1.51117 |
| $r_{5M}$ | −72.400 | | | | |
| $r_{5S}$ | −35.965 | | | | |
| | | $d_5$ | 0.200 | | |
| $r_6$ | 1454.926 | | | | |
| | | $d_6$ | 20.500 | $n_3$ | 1.51117 |
| $r_7$ | −105.860 | | | | |
| | | $\Sigma d$ | 88.000 | ($s' = 318.262$) | |

$-L/f_M = 0.018$
$-f_1/f_M = 2.18$

EMBODIMENT 7

$f_M = 280$ mm, $\beta_M = 0$, $2\omega_M = 64°$, $FNo._M = 30$
$f_S = 56.9$ mm, $\beta_S = -4.60$, eff.$FNo._S = 30$
$\lambda = 780$ nm

| | radius of curvature | axial distance | | refractive index | |
|---|---|---|---|---|---|
| $r_1$ | (stop) | | | | |
| | | $d_1$ | 22.000 | | |
| $r_2$ | −371,369 | | | | |
| | | $d_2$ | 9.500 | $n_1$ | 1.51117 |
| $r_3$ | 1755.803 | | | | |
| | | $d_3$ | 31.200 | | |
| $r_{4M}$ | −69.900 | | | | |
| $r_{4S}$ | ∞ | | | | |
| | | $d_4$ | 8.000 | $n_2$ | 1.48457 |
| $r_{5M}$ | −77.900 | | | | |
| $r_{5S}$ | −35.812 | | | | |
| | | $d_5$ | 0.800 | | |
| $r_6$ | −1909.782 | | | | |
| | | $d_6$ | 15.000 | $n_3$ | 1.78571 |
| $r_7$ | −144.467 | | | | |
| | | $\Sigma d$ | 86.500 | ($s' = 316.345$) | |

$-L/f_M = 0.026$
$-f_1/f_M = 2.14$

EMBODIMENT 8

$f_M = 280$ mm, $\beta_M = 0, 2\omega_M = 64°$, FNo.$_M = 30$
$f_S = 49.9$ mm, $\beta_S = -5.60$. eff.FNo.$_S = 30$
$\lambda = 780$ nm

| radius of curvature | | axial distance | | refractive index | |
|---|---|---|---|---|---|
| $r_1$ | (stop) | | | | |
| | | $d_1$ | 30.000 | | |
| $r_2$ | −225.733 | | | | |
| | | $d_2$ | 3.200 | $n_1$ | 1.51117 |
| $r_3$ | 590.873 | | | | |
| | | $d_3$ | 16.900 | | |
| $r_{4M}$ | −63.350 | | | | |
| $r_{4S}$ | ∞ | | | | |
| | | $d_4$ | 8.000 | $n_2$ | 1.78571 |
| $r_{5M}$ | −71.350 | | | | |
| $r_{5S}$ | −48.924 | | | | |
| | | $d_5$ | 2.400 | | |
| $r_6$ | ∞ | | | | |
| | | $d_6$ | 12.000 | $n_3$ | 1.78571 |
| $r_7$ | −124.153 | | | | |
| | | $\Sigma d$ | 72.500 | ($s' = 326.270$) | |

$-L/f_M = 0.047$
$-f_1/f_M = 1.14$

EMBODIMENT 9

$f_M = 280$ mm, $\beta_M = 0, 2\omega_M = 64°$, FNo.$_M = 30$
$f_S = 49.3$ mm, $\beta_S = -5.69$, eff.FNo.$_S = 30$
$\lambda = 780$ nm

| radius of curvature | | axial distance | | refractive index | |
|---|---|---|---|---|---|
| $r_1$ | (stop) | | | | |
| | | $d_1$ | 22.000 | | |
| $r_2$ | 1280.344 | | | | |
| | | $d_2$ | 5.000 | $n_1$ | 1.51117 |
| $r_3$ | 193.891 | | | | |
| | | $d_3$ | 20.370 | | |
| $r_{4M}$ | −55.800 | | | | |
| $r_{4S}$ | − ∞ | | | | |
| | | $d_4$ | 11.600 | $n_2$ | 1.51117 |
| $r_{5M}$ | −67.400 | | | | |
| $r_{5S}$ | −31.599 | | | | |
| | | $d_5$ | 0.596 | | |
| $r_6$ | 859.343 | | | | |
| | | $d_6$ | 15.000 | $n_3$ | 1.51117 |
| $r_7$ | −97.530 | | | | |
| | | $\Sigma d$ | 74.566 | ($s' = 325.258$) | |

$-L/f_M = 0.030$
$-f_1/f_M = 1.60$

The above mentioned scanning lens system according to the present invention has the advantage of excellent f·θ characteristics and well corrected aberrations which prevents the change of beam diameter on the objective surface from raising more than five percent and enables a record of high dot density over 400 DPI. The scanning lens system further has the advantage of wide field angle which enables a record of wide scanning width corresponding to A3 size of papers. Still further, the scanning lens system is constituted in compact irrespective of the tilt error correction function built therein.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A scanning lens system for a light beam scanning device in which a light beam emitted from a light source is shaped by a beam shaping optical element into a linear image to enter a surface of a deflection member and the beam deflected by the deflection member is restored to a circular-like image and projected onto an objective surface by the scaning lens system, the scanning lens system consisting of from the deflection member side a first, second and third single lens, the first single lens being a spherical lens with a positive refractive power, the second single lens being a toric lens with a negative refractive power in a scanning plane and with a positive refractive power in a plane perpendicular to the scanning plane, and the third single lens being a spherical lens with a positive refractive power.

2. A scanning lens system as claimed in claim 1, wherein the second single lens is a toroidal lens having the center point of the surface curvatures near the deflection point on the deflection member.

3. A scanning lens system as claimed in claim 2 fulfilling the following condition:

$$0.01 < -\frac{l}{f_M} < 0.05$$

wherein l is a length between the deflection point on the deflection member and the center of curvature of the second lens surfaces and $f_M$ is a focal length of the scanning lens system in the scanning direction.

4. A scanning lens system as claimed in claim 2 fulfilling the following condition:

$$1 < -\frac{f_1}{f_M} < 3$$

wherein $f_1$ is a focal length of the first single lens and $f_M$ is a focal length of the scanning lens system in the scanning direction.

5. A scanning lens system as claimed in claim 2 fulfilling the following conditions:

$$0.01 < -\frac{l}{f_M} < 0.05$$

$$1 < -\frac{f_1}{f_M} < 3$$

wherein l is a length between the deflection point on the deflection member and the center of curvature of the second lens surfaces, $f_1$ is a focal length of the first single lens and $f_M$ is a focal length of the scanning lens system in the scanning direction.

* * * * *